United States Patent
Jia

(10) Patent No.: US 11,902,662 B2
(45) Date of Patent: Feb. 13, 2024

(54) IMAGE STABILIZATION METHOD AND APPARATUS, TERMINAL AND STORAGE MEDIUM

(71) Applicant: GUANGDONG OPPO MOBILE TELECOMMUNICATIONS CORP., LTD., Dongguan (CN)

(72) Inventor: Yuhu Jia, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 32 days.

(21) Appl. No.: 17/558,714

(22) Filed: Dec. 22, 2021

(65) Prior Publication Data
US 2022/0116540 A1    Apr. 14, 2022

Related U.S. Application Data

(63) Continuation of application No. PCT/CN2019/102600, filed on Aug. 26, 2019.

(51) Int. Cl.
*H04N 23/68* (2023.01)
*H04N 23/63* (2023.01)
(Continued)

(52) U.S. Cl.
CPC ......... *H04N 23/6845* (2023.01); *H04N 23/63* (2023.01); *H04N 23/6812* (2023.01); *H04N 23/69* (2023.01); *H04N 23/90* (2023.01)

(58) Field of Classification Search
CPC .............. H04N 23/6845; H04N 23/63; H04N 23/6812; H04N 23/69; H04N 23/90; H04N 23/683; H04N 23/687; H04N 23/45
See application file for complete search history.

(56) References Cited

U.S. PATENT DOCUMENTS 9,232,138 B1 * 1/2016 Baldwin .............. H04N 23/682
10,375,310 B2 * 8/2019 Hong ........................ G06T 5/10
(Continued)

FOREIGN PATENT DOCUMENTS

CN      105827964 A    8/2016
CN      106357990 A    1/2017
(Continued)

OTHER PUBLICATIONS

First Office Action from corresponding Chinese Application No. 201980096825.9, dated Feb. 3, 2023. English translation attached.
(Continued)

*Primary Examiner* — Chiawei Chen
(74) *Attorney, Agent, or Firm* — Sheppard, Mullin, Richter & Hampton LLP

(57) ABSTRACT

Embodiments of the present disclosure relate to image stabilization technology, and provide an image stabilization method and apparatus, a terminal, and a storage medium. The method is applied in a terminal equipped with at least two camera modules corresponding to different focal length ranges. The method includes: obtaining a first image outputted from a first camera module of the at least two camera modules and a second image outputted from a second camera module of the at least two camera modules; processing, in a zooming process, the first image and the second image in a predetermined processing scheme to obtain a target image, the predetermined processing scheme including an electric image stabilization process and a zooming process, the zooming process being a process of switching from the first camera module to the second camera module; and displaying the target image on a viewfinder screen.

17 Claims, 6 Drawing Sheets

(51) Int. Cl.
*H04N 23/69* (2023.01)
*H04N 23/90* (2023.01)

(56) References Cited

U.S. PATENT DOCUMENTS

| | | | |
|---|---|---|---|
| 2006/0033817 A1* | 2/2006 | Ishikawa | H04N 23/6811 |
| | | | 348/E5.046 |
| 2010/0271496 A1 | 10/2010 | Obu | |
| 2011/0211082 A1 | 9/2011 | Forssén et al. | |
| 2017/0309031 A1* | 10/2017 | Wu | G06T 7/246 |
| 2018/0048825 A1 | 2/2018 | Wang | |
| 2018/0160044 A1* | 6/2018 | Lee | H04N 23/57 |
| 2019/0052802 A1 | 2/2019 | Huang | |
| 2019/0068886 A1* | 2/2019 | Baek | H04N 23/69 |
| 2019/0104255 A1* | 4/2019 | Shi | H04N 23/6811 |
| 2019/0191090 A1* | 6/2019 | Murashima | H04N 23/685 |
| 2021/0241434 A1* | 8/2021 | Kim | G06T 11/60 |
| 2022/0264006 A1* | 8/2022 | Jeong | H04N 23/00 |

FOREIGN PATENT DOCUMENTS

| | | |
|---|---|---|
| CN | 108259759 A | 7/2018 |
| CN | 108377342 A | 8/2018 |
| CN | 109155822 A | 1/2019 |
| CN | 109194881 A | 1/2019 |
| CN | 109685854 A | 4/2019 |
| CN | 109688321 A | 4/2019 |
| EP | 3448011 A1 | 2/2019 |
| JP | H06217187 A | 8/1994 |
| WO | 2013007164 A1 | 1/2013 |

OTHER PUBLICATIONS

Extended European Search Report dated May 18, 2022 received in European Patent Application No. EP 19943750.0.
International Search Report and Written Opinion dated May 14, 2020 in International Application No. PCT/CN2019/102600. English translation attached.
Grant Notice & Supplementary Search from corresponding Chinese Application No. 201980096825.9, dated Jul. 14, 2023 . English translation attached.

* cited by examiner

IMAGE STABILIZATION METHOD AND APPARATUS, TERMINAL AND STORAGE MEDIUM

CROSS REFERENCE OF RELATED APPLICATION

The present disclosure is a continuation of the International Application No. PCT/CN2019/102600 filed on Aug. 26, 2019, which is hereby incorporated by reference in its entirety.

TECHNICAL FIELD

The embodiments of the present disclosure relates to image stabilization technology, and more particularly, to an image stabilization method and apparatus, a terminal, and a storage medium.

BACKGROUND

Due to the limitation in size of a mobile terminal, it is difficult to provide a camera module with a large zoom factor in the mobile terminal. In order to achieve a zoom effect similar to that of a camera module with a large zoom factor, thereby improving the imaging quality of a mobile terminal, more and more mobile terminals are now configured with a plurality of camera modules.

In the related art, each camera module in a mobile terminal with a plurality of camera modules corresponds to a different focal length range. For example, taking a mobile terminal equipped with three camera modules as an example, the three camera modules may include, in the ascending order of focal length, an ultra-wide-angle camera module, a wide-angle camera module, and a telephoto camera module. When zooming during image shooting, the mobile terminal may switch between displaying images captured by the camera modules with different focal length ranges.

SUMMARY

The embodiments of the present disclosure provide an image stabilization method and apparatus, a terminal, and a storage medium. The technical solutions are as follows.

In an aspect, an embodiment of the present disclosure provides an image stabilization method. The method is applied in a terminal equipped with at least two camera modules corresponding to different focal length ranges. The method includes: obtaining a first image outputted from a first camera module of the at least two camera modules and a second image outputted from a second camera module of the at least two camera modules; processing, in a zooming process, the first image and the second image in a predetermined processing scheme to obtain a target image, the predetermined processing scheme including an electric image stabilization process and a zooming process, the zooming process being a process of switching from the first camera module to the second camera module; and displaying the target image on a viewfinder screen.

In another aspect, an embodiment of the present disclosure provides an image stabilization apparatus. The apparatus is applied in a terminal equipped with at least two camera modules corresponding to different focal length ranges. The apparatus includes: a first obtaining module configured to obtain a first image outputted from a first camera module of the at least two camera modules and a second image outputted from a second camera module of the at least two camera modules; a first processing module configured to process, in a zooming process, the first image and the second image in a predetermined processing scheme to obtain a target image, the predetermined processing scheme including an electric image stabilization process and a zooming process, the zooming process being a process of switching from the first camera module to the second camera module; and a display module configured to display the target image on a viewfinder screen.

In another aspect, an embodiment of the present disclosure provides a terminal. The terminal includes at least two camera modules corresponding to different focal length ranges, a processor, a memory, and a display module. The memory stores at least one instruction that is executed by the processor to: obtain a first image outputted from a first camera module of the at least two camera modules and a second image outputted from a second camera module of the at least two camera modules; process, in a zooming process, the first image and the second image in a predetermined processing scheme to obtain a target image, the predetermined processing scheme including an electric image stabilization process and a zooming process, the zooming process being a process of switching from the first camera module to the second camera module; and control the display module to display the target image on a viewfinder screen.

In another aspect, an embodiment of the present disclosure provides a computer-readable storage medium. The computer-readable storage medium stores at least one instruction that is executed by a processor to implement the image stabilization method according to the above aspect.

In another aspect, an embodiment of the present disclosure provides a computer program product. The computer program product, when running on a computer, causes the computer to perform the image stabilization method according to the above aspect.

The technical solutions according to the embodiments of the present disclosure may have at least the following advantageous effects.

For a terminal equipped with at least two camera modules, in a process of switching from a first camera module to a second camera module, a first image outputted from the first camera module and a second image outputted from the second camera module can be obtained, and a predetermined process can be performed on the first image and the second image, so as to obtain a target image that has been subjected to an electric image stabilization process and a zooming process, and then the target image can be displayed on a viewfinder screen. Since the finally displayed target image has been subjected to the electronic stabilization process and the zooming process, the shake of the image caused by the shake of the terminal during the zooming process can be reduced while ensuring smooth switching of the image during the zooming process, thereby improving the stability of the image on the viewfinder screen.

BRIEF DESCRIPTION OF DRAWINGS

In order to describe the technical solutions in the embodiments of the present disclosure more clearly, the drawings to be used in the description of the embodiments will be briefly introduced below. Obviously, the drawings in the following description are only some embodiments of the present disclosure, and other drawings can be obtained by those of ordinary skill in the art based on these drawings without any inventive efforts.

DESCRIPTION OF EMBODIMENTS

The embodiments of the present disclosure will be further described in detail below with reference to the accompanying drawings, such that the objects, technical solutions, and advantages of the present disclosure will become more apparent.

To facilitate understanding, terms used in the embodiments of the present disclosure will be described first below.

Intrinsic parameter matrix: In a camera imaging model (such as a small hole imaging model), a matrix composed of intrinsic parameters is referred to as an intrinsic parameter matrix. The intrinsic parameters include a focal length f and center coordinate offsets $c_x$ and $c_y$. Accordingly, the intrinsic parameter matrix can be expressed as $$\begin{bmatrix} f & 0 & c_x \\ 0 & f & c_y \\ 0 & 0 & 1 \end{bmatrix}.$$

For a camera with a fixed focal length range, the focal length in the intrinsic parameter matrix f is a constant value, while for a camera with an optical image stabilization function, the center coordinate offsets $c_x$ and $c_y$ in the intrinsic parameter matrix changes as the lens moves.

Extrinsic parameter matrix: In a camera imaging model, a matrix composed of extrinsic parameter parameters is referred to as an extrinsic parameter matrix. The extrinsic parameter parameters include a rotation matrix R and a translation matrix T of the camera in a world coordinate system. When the posture of the camera in the world coordinate system changes, for example, when the camera angle rotates or the camera translates, the rotation matrix R and the translation matrix T will also change accordingly.

Image stabilization: Image stabilization is a scheme for stabilizing an image to reduce an impact of a shake of a camera on image stability. Commonly used schemes of image stabilization include Optical Image Stabilization (OIS) and Electric Image Stabilization (EIS). The principle of OIS is to improve the image stability by changing an orientation of a lens, and the principle of EIS is to re-project the image based on a posture of the camera to improve the image stability. The OIS has a better image stabilization effect than the EIS, and the EIS has a larger image stabilization range than the OIS.

Figure 1:
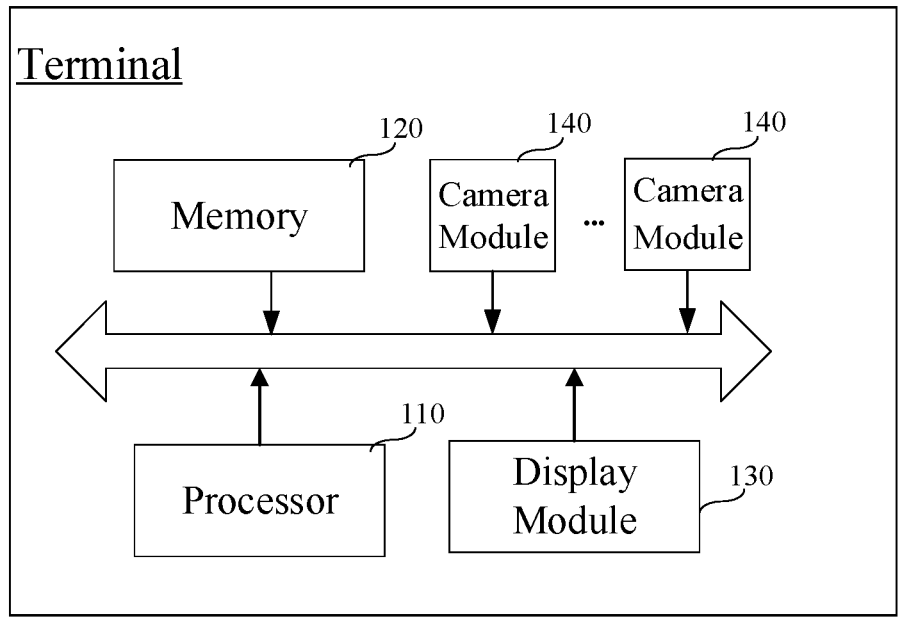
FIG. 1 is a block diagram showing a structure of a terminal according to an exemplary embodiment of the present disclosure.

FIG. 1 is a block diagram showing a structure of a terminal according to an exemplary embodiment of the present disclosure. The terminal may be a smart phone, a tablet computer, a notebook computer, or the like. The terminal in the present disclosure may include the following components: a processor 110, a memory 120, a display module 130, and at least two camera modules 140.

The processor 110 may include one or more processing cores. The processor 110 uses various interfaces and wires to connect various parts of the entire terminal, and executes various functions of the terminal and processing data by running or executing instructions, programs, code sets, or instruction sets stored in the memory 120, and invoking data stored in the memory 120, so as to implement the image stabilization method according to each embodiment of the present disclosure.

Optionally, the processor 110 may be implemented in hardware using at least one of Digital Signal Processor (DSP), Field-Programmable Gate Array (FPGA), or Programmable Logic Array (PLA). The processor 110 may be integrated with one or more of a Central Processing Unit (CPU), a Graphics Processing Unit (GPU), a Neural-network Processing Unit (NPU), a modem, etc., or any combination thereof. Here, the CPU mainly processes an operating system, a user interface, and application programs. The GPU is configured to render and draw content that needs to be displayed by a touch display module 130. The NPU is configured to implement Artificial Intelligence (AI) functions. The modem is configured to handle wireless communications. It can be appreciated that the above modem may not be integrated into the processor 110, but may be implemented as a standalone chip.

The memory 120 may include a Random Access Memory (RAM) or a Read-Only Memory. Optionally, the memory 120 may include anon-transitory computer-readable storage medium. The memory 120 may be configured to store instructions, programs, codes, code sets or instruction sets. The memory 120 may include a program storage area and a data storage area. The program storage area may store instructions for implementing the operating system instructions for at least one function (such as a touch function, a sound playback function, an image playback function, etc.), instructions for implementing various method embodiments as described below, etc. The storage data area may store data (such as image data, audio data) created depending on the use of the terminal, and the like.

The display module 130 (or referred to as a display screen) is a module for displaying a user interface. Optionally, the display module 130 may have a touch function. With the touch function, the user can use any suitable object such as a finger or a stylus to perform a touch operation on the display module 130.

The display module 130 is typically arranged on a front panel of the terminal. The display module 130 can be designed as a full screen, a curved screen, a special-shaped screen, a double-sided screen, or a foldable screen. The display module 130 can also be designed as a combination of a full screen and a curved screen, or a combination of a special-shaped screen and a curved screen, and the embodiment of the present disclosure is not limited to any of these examples.

The camera module 140 is a module configured to capture images, which can be implemented as a front camera module arranged on a front panel side of the terminal or a rear camera module arranged on a back cover side of the terminal. In an embodiment of the present disclosure, the terminal can be provided with at least two camera modules 140 provided on the same side.

Figure 2:
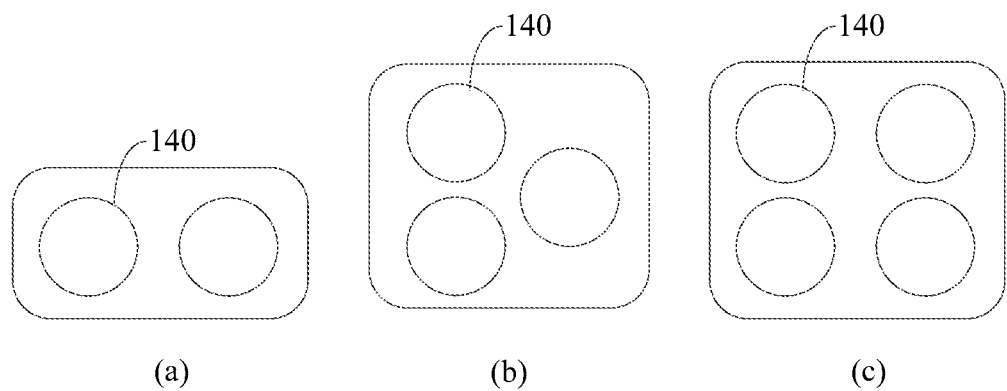
FIG. 2 is a schematic diagram showing arrangements of camera modules.

Regarding the arrangement of the at least two camera modules 140, in a possible implementation, the at least two camera modules 140 may be arranged in an array. For example, as shown in FIG. 2 (a), when two camera modules 140 are provided, the two camera modules 140 may be arranged side by side. As shown in FIG. 2 (b), when three camera modules 140 are provided, the three camera modules 140 may be arranged in an equilateral triangle shape. As shown in FIG. 2(c), when four camera modules 140 are provided, the four camera modules 140 may be arranged in a square shape. Of course, the camera modules 140 may have other possible arrangements, and the embodiment of the present disclosure is not limited by any of these examples.

In an embodiment of the present disclosure, in order to achieve a zoom effect similar to a camera module with a large zoom factor using at least two camera modules 140, different camera modules 140 may correspond to different focal length ranges. During a zooming process, a software algorithm may be used in combination with switching between the camera modules 140 to achieve smooth zooming in a plurality of focal length ranges. In an illustrative example, when the terminal is provided with three camera modules 140, the three camera modules 140 may include an ultra-wide-angle camera module, a wide-angle camera module, and a telephoto camera module (in an ascending order of focal lengths). In a process of zooming from near to far, the terminal may control to gradually switch from the ultra-wide-angle camera module to the wide-angle camera module, and gradually switch from the wide-angle camera module to the telephoto camera module.

In addition, it can be appreciated by those skilled in the art that the structure of the terminal shown in the above figure does not constitute a limitation on the terminal. Rather, the terminal may include more or less components than those shown in the figure, or a combination of certain components, or a different component arrangement. For example, the terminal may further include components such as a flashlight, a microphone, a speaker, a radio frequency circuit, an input unit, a sensor, an audio circuit, a wireless fidelity (WiFi) module, a power supply, a Bluetooth module, etc., and details thereof will be omitted here.

Figure 3:
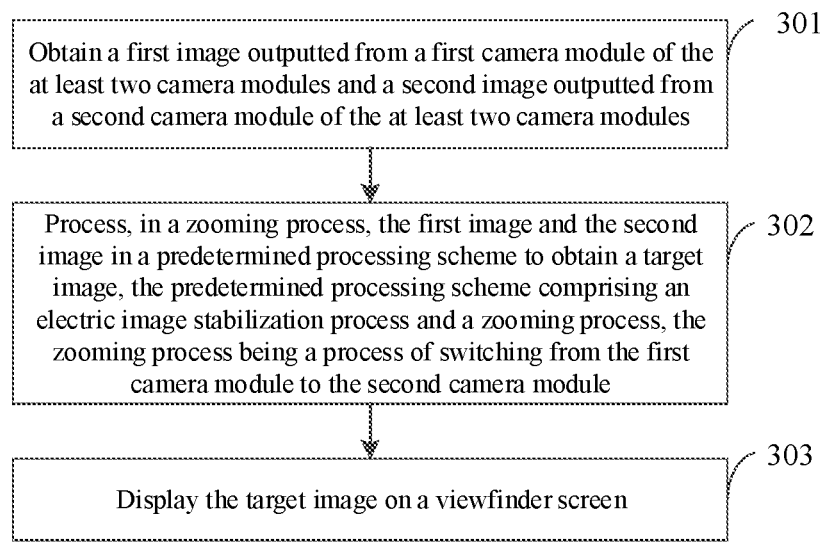
FIG. 3 is a flowchart illustrating an image stabilization method according to an exemplary embodiment of the present disclosure.

FIG. 3 is a flowchart illustrating an image stabilization method according to an exemplary embodiment of the present disclosure. The method can be applied in the terminal shown in FIG. 1, and the method may include the following steps.

At step 301, a first image outputted from a first camera module of the at least two camera modules and a second image outputted from a second camera module of the at least two camera modules are obtained.

In a possible implementation, the first camera module and the second camera module may be two camera modules having adjacent focal length ranges among the at least two camera modules.

In an illustrative example, an ultra-wide-angle lens with a focal length of 16 mm, a wide-angle lens with a focal length of 30 mm, and a telephoto lens with a focal length of 300 mm may be provided in the terminal. The first camera module and the second camera module may be the ultra-wide-angle lens and the wide-angle lens, respectively. Alternatively, the first camera module and the second camera module may be the wide-angle lens and the telephoto lens, respectively. The embodiment of the present disclosure only takes the above three possible camera modules as an example for description, but is not limited to this example.

In a possible implementation, when it is detected that a camera application is started, the terminal may activate a default camera module and at least one adjacent camera module having a focal length range that is adjacent to that of the default camera module, and capture images using the default camera module and the at least one adjacent camera module. For example, when the default camera module is an ultra-wide-angle lens, the terminal may simultaneously activate the ultra-wide-angle lens and a wide-angle lens for capturing images. When the default camera module is a wide-angle lens, the terminal may simultaneously activate an ultra-wide-angle lens, the wide-angle lens, and a telephoto lens to meet different zoom requirements (zoom in or zoom out).

Optionally, the first image and the second image may both be images that have not been processed (specifically, have not been subjected to a re-projection process), i.e., images actually captured by the first camera module and the second camera module.

At step 302, in a zooming process, the first image and the second image are processed in a predetermined processing scheme to obtain a target image. The predetermined processing scheme includes an electric image stabilization process and a zooming process. The zooming process is a process of switching from the first camera module to the second camera module.

In a possible implementation, when a zooming signal is received, the terminal gradually switches from the current first camera module to the second camera module according to a zooming scheme indicated by the zooming signal, with the image outputted from the first camera module being displayed on a viewfinder screen. Here, the zooming signal may be a signal generated when the user drags a zooming control on a user interface, and the zooming scheme indicated by the zooming signal may be zooming in or zooming out.

Optionally, due to a relative offset between configured orientations of the different camera modules, in order to avoid the image offset during the process of switching between the camera modules, the terminal may perform the zooming process on the first image and the second image to ensure smooth image switching. In addition, in order to avoid the problem associated with the shake of the image due to the shake of the terminal during the image capturing process, the terminal may perform a stabilization process on the first image and the second image to improve the stability of the image.

In a possible implementation, the electric image stabilization process and the zooming process may be performed by different modules. For example, the electric image stabilization process may be performed by an image stabilization module, and the zooming process may be performed by a zooming module, and the two processes may be performed asynchronously. For example, after the image stabilization module has completed the image stabilization process, the zooming module can perform the zooming process on the stabilized images. Alternatively, after the zooming module has completed the zooming process for the images, and the image stabilization module can perform the image stabilization process on the zoomed images. This embodiment is not limited to any timing sequence of the zooming process and the electric image stabilization process.

At step 303, the target image is displayed on a viewfinder screen.

After the electric image stabilization process and the zooming process have been completed in the above steps, the terminal can further display the resulting target image on the viewfinder screen. It is to be noted that since the first camera module and the second camera module capture images continuously, the terminal will generate target images using the above steps continuously, such that the target image on the viewfinder screen will change continuously, that is, a dynamic image will be presented.

The embodiment has been described with reference to an example of switching from the first camera module to the second camera module as an example only. After switching to the second camera module, it may further switch to a third camera module or switch back to the first camera module. The zooming process and the electric image stabilization process will also be performed during these switching processes, and details thereof will be omitted here.

To summarize, in this embodiment, for a terminal equipped with at least two camera modules, in a process of switching from a first camera module to a second camera module, a first image outputted from the first camera module and a second image outputted from the second camera module can be obtained, and a predetermined process can be performed on the first image and the second image, so as to obtain a target image that has been subjected to an electric image stabilization process and a zooming process, and then the target image can be displayed on a viewfinder screen. Since the finally displayed target image has been subjected to the electronic stabilization process and the zooming process, the shake of the image caused by the shake of the terminal during the zooming process can be reduced while ensuring smooth switching of the image during the zooming process, thereby improving the stability of the image on the viewfinder screen.

Figure 4:
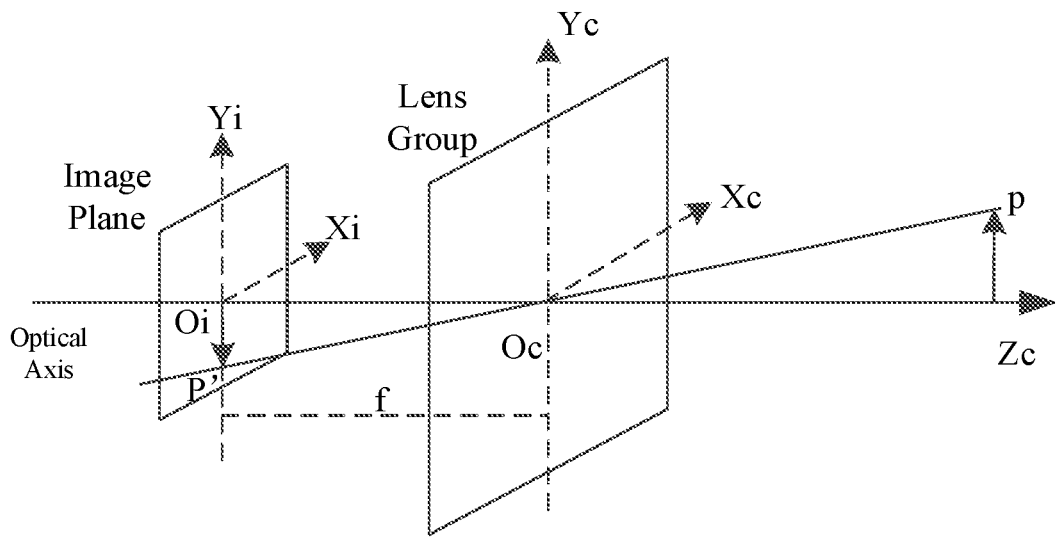
FIG. 4 is a schematic diagram showing imaging using a small hole imaging model.

In an example where the camera model is a small hole imaging model, as shown in FIG. 4, with the small hole imaging via a lens group plane XcOcYc, a three-dimensional space point p in the world coordinate system is mapped to p' on an image plane XiOiYi. The mapping process can be expressed as:

$$Z_c \begin{bmatrix} u \\ v \\ 1 \end{bmatrix} = \begin{bmatrix} f & 0 & c_x \\ 0 & f & c_y \\ 0 & 0 & 1 \end{bmatrix} \begin{bmatrix} R & T \\ 0 & 1 \end{bmatrix} \begin{bmatrix} x \\ y \\ z \end{bmatrix} = K \begin{bmatrix} R & T \\ 0 & 1 \end{bmatrix} \begin{bmatrix} x \\ y \\ z \end{bmatrix}, \quad \text{(Equation 1)}$$

where f represents a focal length, $c_x$ and $c_y$ represent center coordinate offsets, K represents the intrinsic parameter matrix containing intrinsic parameters, (x, y, z) represent the coordinates of the three-dimensional space point p in the world coordinate system, (u, v) represent the pixel coordinates of p' on the image plane, R and T represent a rotation matrix and a translation matrix of the camera in the world coordinate system, respectively, and $Z_c$ represents an object distance of the three-dimensional space point p in the camera coordinate system.

When a shake occurs while capturing an image (i.e., the posture of the camera in the world coordinate system changes), the extrinsic parameter matrix of the camera will change, and accordingly, a shake will occur in the image outputted from the camera module. In order to achieve image stabilization, the image currently outputted from the camera module needs to be re-projected according to a current posture and a target posture (i.e., the image is projected from the current posture to the target posture). The re-projection process can be described as:

$$\begin{bmatrix} u \\ v \\ 1 \end{bmatrix} = \frac{Z_c'}{Z_c} K \begin{bmatrix} R & T \\ 0 & 1 \end{bmatrix} \begin{bmatrix} R' & T' \\ 0 & 1 \end{bmatrix}^{-1} K^{-1} \begin{bmatrix} u' \\ v' \\ 1 \end{bmatrix}, \quad \text{(Equation 2)}$$

where R and T represent a rotation matrix and a translation matrix in the target posture, R' and T' represent a rotation matrix and a translation matrix in the current posture, (u', v') represent the pixel coordinates of the three-dimensional space point on the image plane in the current posture, and $Z_c$ represents an object distance in the current posture.

Further, assuming that the depth of the three-dimensional space point is constant (i.e., $Z_c'=Z_c$) and only the rotation of the camera is considered, and the translation of the camera is not considered (i.e., the translation matrix T and T' are ignored), the above re-projection process can be simplified as:

$$\begin{bmatrix} u \\ v \\ 1 \end{bmatrix} = KRR'^T K^{-1} \begin{bmatrix} u' \\ v' \\ 1 \end{bmatrix}. \quad \text{(Equation 3)}$$

The above process is an explanation of the principle of re-projecting the image in the electric image stabilization process to reduce the shake of the image. The principle of the multi-camera zooming process will be explained below.

Figure 5:
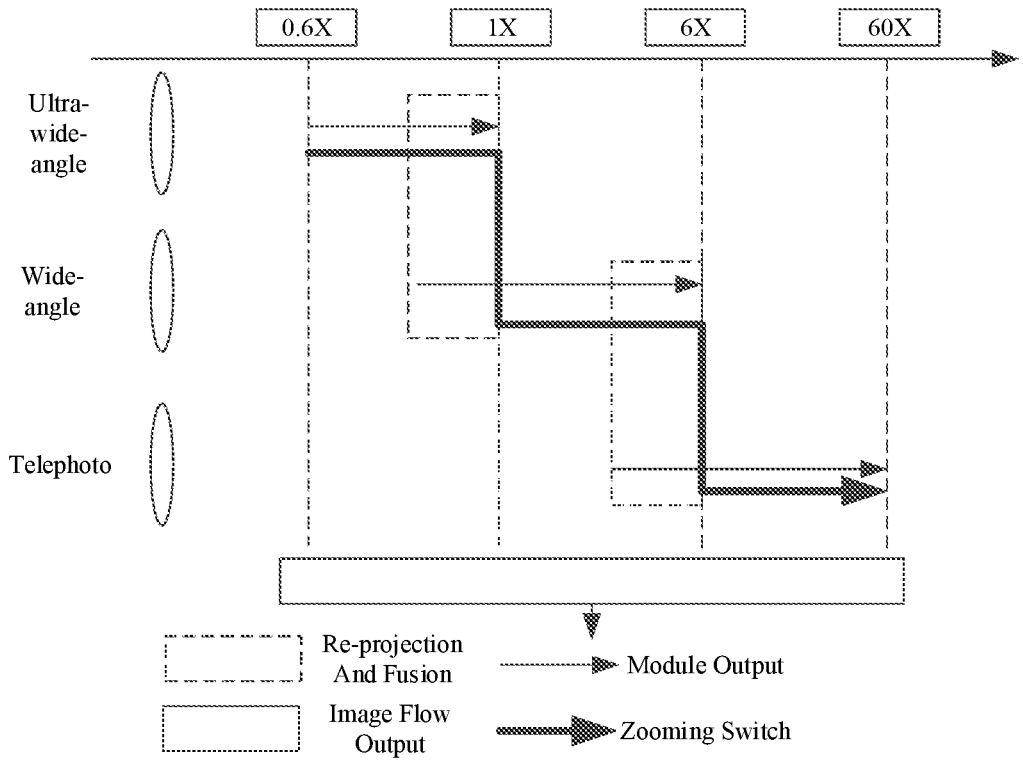
FIG. 5 is a schematic diagram showing a multi-camera zooming process according to an exemplary embodiment.

For a terminal equipped with a plurality of camera modules having different focal length ranges, the zooming process may be completed in sequence. As shown in FIG. 5, the terminal is equipped with an ultra-wide-angle camera module, a wide-angle (or referred to as a normal lens or a main lens) camera module, and a telephoto camera module. In the process of switching from ultra-wide-angle to wide-angle and then to telephoto (assuming that no shake of the terminal occurs), since the different camera modules have different postures in the world coordinate system, in order to ensure that the image does not drift during the zooming process, the image outputted from each module need to be re-projected and fused.

Here, in the process of switching from the ultra-wide-angle camera module to the wide-angle camera module, a wide-angle image outputted from the wide-angle camera module needs to be re-projected to the same posture as the ultra-wide-angle image, and fused with an ultra-wide-angle image. In the process of switching from the wide-angle camera module to the telephoto camera module, a telephoto image outputted from the telephoto camera module needs to be re-projected to the same posture as the wide-angle image and fused with a wide-angle image.

In a possible implementation, with the assumption that the camera modules are rigidly connected, ΔR and ΔT between the camera modules can be obtained by extrinsic parameter calibration, or ΔR and ΔT between the images can be calculated by means of image matching based on the intrinsic parameters. Accordingly, the process of re-projecting the image outputted from one camera module to the posture of another camera module can be expressed as:

$$\begin{bmatrix} u \\ v \\ 1 \end{bmatrix} = K \begin{bmatrix} \Delta R & \Delta T \\ 0 & 1 \end{bmatrix}^{-1} K^{-1} \begin{bmatrix} u' \\ v' \\ 1 \end{bmatrix}, \quad \text{(Equation 4)}$$

where (u, v) represent the pixel coordinates of the re-projected pixel, (u', v') represent the pixel coordinates of the pixel in the image outputted from the camera module before the re-projection, K represents the intrinsic parameter matrix, and ΔR and ΔT represent the rotation matrix and the translation matrix between the camera modules (i.e., the differences between the rotation matrices and the translation matrices of the), respectively.

It can be seen from the above electric image stabilization process and the zooming process that, since the electric image stabilization and zooming are both based on re-projection, there will be some conflicts between the re-projection for the electric image stabilization process and the re-projection for the zooming process. In the related art, in order to avoid the conflicts between the electric image stabilization and zooming, the terminal only performs the electric image stabilization in a non-zooming processes, and disables the electric image stabilization during the zooming process. Although this method can avoid the conflicts between the electric image stabilization and zooming, when the terminal shakes in the zooming process (for example, when the user holds the terminal in hand for shooting images), since the electric image stabilization function is disabled, a significant shake of the image make occur in the zooming process, which will degrade the user's shooting experience.

In order to avoid the conflicts between the re-projection for electric image stabilization and the re-projection for zooming, in the image stabilization method according to the embodiment of the present disclosure, when performing the predetermined process on the first image and the second image, the image stabilization module responsible for the electric image stabilization process and the zooming module responsible for the zooming process will exchange matrix information with each other In a possible implementation, after the electric image stabilization process has been performed on the first image and the second image, the terminal can perform the zooming process based on matrix information outputted in the electric image stabilization process to obtain the target image. In another possible implementation, after performing the zooming process on the first image and the second image, the terminal can perform the electric image stabilization process based on matrix information outputted in the zooming process to obtain the target image. These two processing schemes will be described below with reference to illustrative embodiments.

Figure 6:
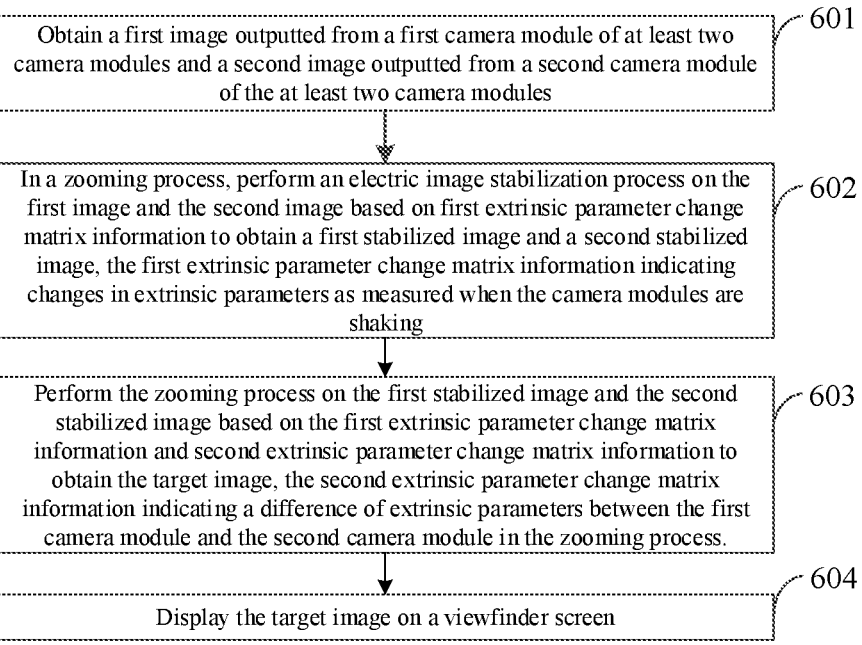
FIG. 6 is a flowchart illustrating an image stabilization method according to an exemplary embodiment of the present disclosure.

FIG. 6 is a flowchart illustrating an image stabilization method according to an exemplary embodiment of the present disclosure. The image stabilization method according to this embodiment may be applied in the terminal shown in FIG. 1. In this example, the terminal performs an electric image stabilization process before performing a zooming process. The method may include the following steps.

At step 601, a first image outputted from a first camera module of at least two camera modules and a second image outputted from a second camera module of the at least two camera modules are obtained.

For the implementation of this step, reference may be made to the above step 301, and details thereof will be omitted here.

At step 602, in a zooming process, an electric image stabilization process is performed on the first image and the second image based on first extrinsic parameter change matrix information to obtain a first stabilized image and a second stabilized image. The first extrinsic parameter change matrix information indicates changes in extrinsic parameters as measured when the camera modules are shaking.

In a possible implementation, in the zooming process, the terminal can use a gyroscope (gyro-sensor) to measure an angular velocity of the terminal, and calculate a rotation angle of the terminal based on the angular velocity data, so as to determine a current rotation matrix for the terminal based on the rotation angle, and in turn determine a current extrinsic parameter matrix (an extrinsic parameter matrix corresponding to a current posture) based on the current rotation matrix.

When performing the electric image stabilization process on the first image and the second image, the terminal re-projects the first image and the second image, respectively, based on the current extrinsic parameter matrix and a target extrinsic parameter matrix (an extrinsic parameter matrix corresponding to a target posture), to obtain the first stabilized image and the second stabilized image. The first extrinsic parameter change matrix information as used in the embodiment of the present disclosure can indicate changes between the current extrinsic parameter matrix (with shaking) and the target extrinsic parameter matrix (without shaking).

In an illustrative example, in the zooming process, the terminal performs a re-projection process on the first image and the second image based on the above Equation 2 (since the translation matrix cannot be measured accurately, the translation matrix can also be ignored and Equation 3 can be used instead), so as to obtain the first stabilized image and the second stabilized image.

At step 603, the zooming process is performed on the first stabilized image and the second stabilized image based on the first extrinsic parameter change matrix information and second extrinsic parameter change matrix information to obtain the target image. The second extrinsic parameter change matrix information indicates a difference in extrinsic parameters between the first camera module and the second camera module in the zooming process.

Since the image has been re-projected once in the electric image stabilization process, in order to re-project the first stabilized image and the second stabilized image in the correct posture in the zooming process, in addition to obtaining the second extrinsic parameter change matrix information between the first camera module and the second camera module, it is also necessary to obtain the matrix information used by the terminal to re-project the images in the electric image stabilization process, and then perform the re-projection in the zooming process based on the two pieces of matrix information.

In a possible implementation, the process of zooming the stabilized image may use the following equation:

$$\begin{bmatrix} u \\ v \\ 1 \end{bmatrix} = K \begin{bmatrix} R' & T' \\ 0 & 1 \end{bmatrix} \begin{bmatrix} R & T \\ 0 & 1 \end{bmatrix}^{-1} K^{-1} \begin{bmatrix} u' \\ v' \\ 1 \end{bmatrix}, \quad \text{(Equation 5)}$$

where (u', v') represent the pixel coordinates of the pixel in the stabilized image, (u, v) represent the pixel coordinates of the pixel in the target image after the zooming processing, R' and T' represent the rotation matrix and the translation matrix (i.e., the first extrinsic parameter change matrix information) for re-projecting the image in the electric image stabilization process, R represents the rotation matrix between the modules in the zooming process and T represents the translation matrix between the modules in the zooming process (i.e., R and T represent the second extrinsic parameter matrix information), and K represents the intrinsic parameter matrix (when the optical image stabilization function is provided, it can be replaced with a new intrinsic parameter matrix K' after lens movement).

Figure 7:
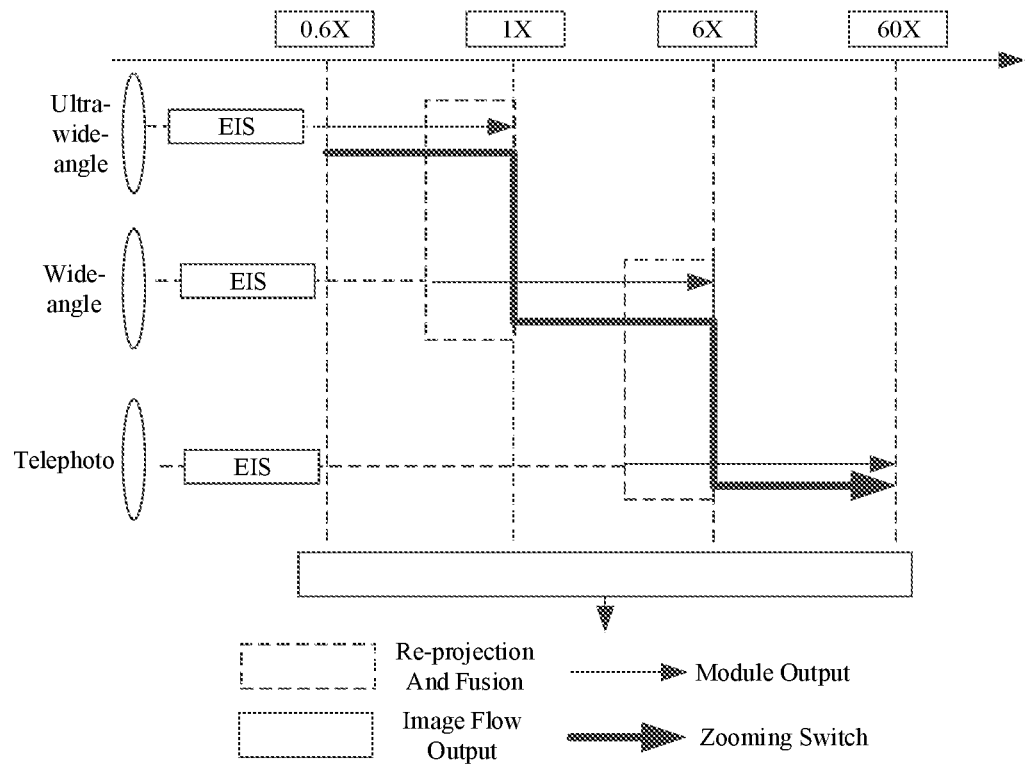
FIG. 7 is a schematic diagram showing the principle of the implementation process of the image stabilization method shown in FIG. 6.

Schematically, as shown in FIG. 7, taking the process of switching from a wide-angle lens to a telephoto lens as an example, if the zoom factor (6×) for switching the module is not reached, the stabilized image outputted from the wide-angle lens needs to be digitally zoomed, and the digitally-zoomed stabilized image can be displayed on the display screen. In order to improve the definition of the digitally-zoomed image, in the process of zooming from 1× to 6× (for example, when the digital zoom factor reaches a threshold), the telephoto image outputted from the telephoto lens (that has been subjected to electric image stabilization) needs to be re-projected. The re-projected telephoto image is fused with the digitally-zoomed wide-angle image to improve the definition of the finally displayed target image. In a possible implementation, this step may include the following steps.

1. The first stabilized image is zoomed digitally based on a current focal length range to obtain a first digitally-zoomed stabilized image corresponding to a Field of View (FOV) that is same as a FOV corresponding to the current focal length range.

In a possible implementation, when digitally zooming the first stabilized image, the terminal determines an FOV corresponding to the current focal length range, and crops an area having the same size as the FOV of the current focal length range from the center of the first stabilized image to obtain the first digitally-zoomed stabilized image. Here, the correspondence between FOVs and focal length ranges can be determined in advance.

Figure 8:
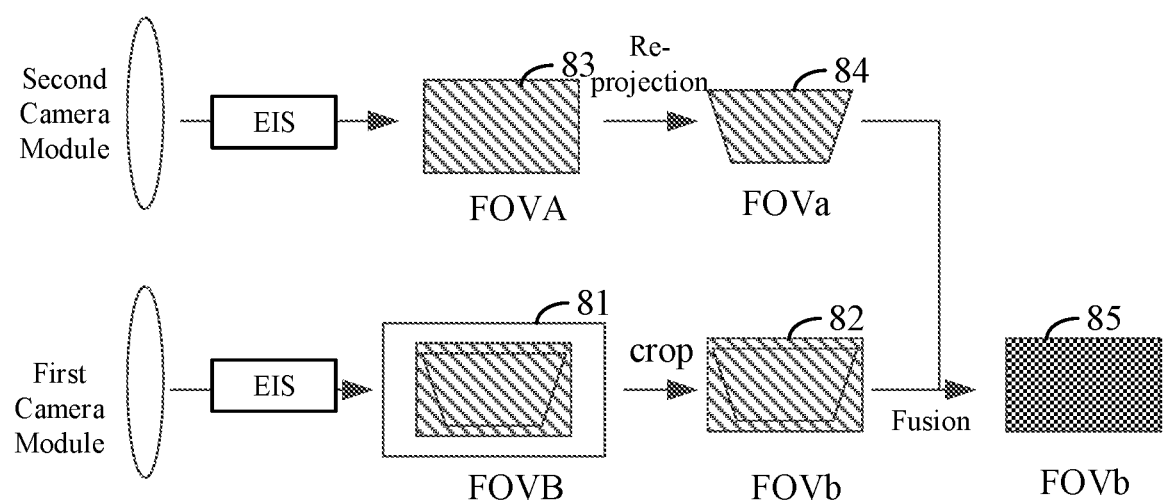
FIG. 8 is a schematic diagram showing an implementation of a process for re-projecting and fusing images.

Schematically, as shown in FIG. 8, in the process of switching from the first camera module to the second camera module (the focal length range of the first camera module is smaller than the focal length range of the second camera module), the terminal performs a stabilization process on the first image outputted from the first camera module to obtain the first stabilized image 81 (corresponding to FOVB). In the process of digitally zooming the first stabilized image 81, the terminal crops an area of the size of FOVb from the center of the first stabilized image 81 based on FOVb corresponding to the current focal length range, to obtain the digitally-zoomed image 82.

2. The second stabilized image is re-projected based on the second extrinsic parameter change matrix information and the first extrinsic parameter change matrix information to obtain a second re-projected stabilized image.

In order to improve the definition of the digital zooming, the terminal needs to re-project the second stabilized image to align it with the image of the first camera module. In a possible implementation, the terminal can determine the second extrinsic parameter change matrix information based on the extrinsic parameter matrix corresponding to the first camera module and the extrinsic parameter matrix information for the second camera module. Since the second stabilized image to be re-projected has been re-projected in the electric image stabilization phase, in order to ensure the re-projection in the zooming process to be performed in the correct posture, the terminal needs to re-project the second stabilized image based on the second extrinsic parameter change matrix information outputted in the electric image stabilization phase and the first extrinsic parameter change matrix information, to obtain the second re-projected stabilized image.

Optionally, since the equivalent focal length of the first camera module is constantly changing during the digital zooming process, the second extrinsic parameter change matrix information is also changing.

Schematically, as shown in FIG. 8, after the second image outputted from the second camera module has been subjected to the stabilization process, the second stabilized image 83 (corresponding to FOVA) is obtained. In the re-projection process, the terminal re-projects the second stabilized image 83 based on the second extrinsic parameter change matrix information and the first extrinsic parameter change matrix information, to obtain a re-projected image 84 (corresponding to FOVa).

In a possible implementation, in order to reduce the amount of calculation in the re-projection process, the terminal may also obtain mesh information for the re-projection operation in the electric image stabilization process, and perform re-projection based on the mesh information in the zooming process. The embodiment is not limited to this.

3. The first digitally-zoomed stabilized image and the second re-projected stabilized image are fused to obtain the target image.

Further, the terminal can fuse the first digitally-zoomed stabilized image and the second re-projected stabilized image, so as to improve the definition of the first digitally-zoomed stabilized image. Here, the target image is an image obtained by optimizing the definition of the first digitally-zoomed stabilized image with reference to pixels in the second re-projected stabilized image.

Schematically, as shown in FIG. 8, the terminal fuses the re-projected image 84 and the digitally-zoomed image 82 to obtain a target image 85.

At step 604, the target image is displayed on a viewfinder screen.

For the implementation of this step, reference may be made to the above step 303, and details thereof will be omitted here.

In the embodiment, the terminal first performs the electric image stabilization on the images outputted from the camera modules, and provides the matrix information for the re-projection operation performed by the electric image stabilization module on the images to the zooming module, so as to ensure that the zooming module can perform the re-projection in the zooming process in the correct posture, thereby avoiding conflicts between the re-projection in the zooming process and the re-projection in the electric image stabilization process, and improving the accuracy of the re-projection in the zooming process.

In addition, in this embodiment, the image outputted from the second camera module is re-projected to align it with the image outputted from the first camera module, such that it can be subsequently fused with the digitally-zoomed image, which facilitates improving the definition of the target image finally displayed on the viewfinder screen.

Figure 9:
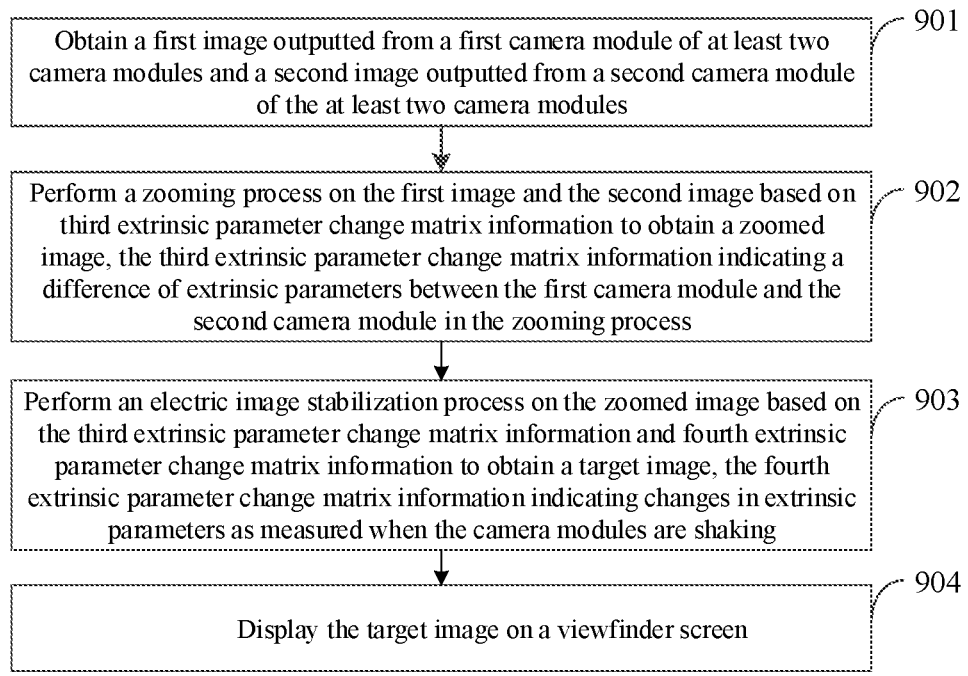
FIG. 9 is a flowchart illustrating an image stabilization method according to another exemplary embodiment of the present disclosure.

FIG. 9 is a flowchart of an image stabilization method according to another exemplary embodiment of the present disclosure. In this embodiment, the image stabilization method may be applied in the terminal shown in FIG. 1. In this example, the terminal performs a zooming process before performing an electric image stabilization process. The method may include the following steps.

At step 901, a first image outputted from a first camera module of at least two camera modules and a second image outputted from a second camera module of the at least two camera modules are obtained.

For the implementation of this step, reference may be made to the above step 301, and details thereof will be omitted here.

At step 902, a zooming process is performed on the first image and the second image based on third extrinsic parameter change matrix information to obtain a zoomed image. The third extrinsic parameter change matrix information indicates a difference of extrinsic parameters between the first camera module and the second camera module in the zooming process.

In contrary to the embodiment shown in FIG. 6, in this embodiment, for the outputted first image and second image, instead of directly performing an electric image stabilization process on the first image and the second image, the terminal performs the zooming process on both images to obtain zoomed images.

In a possible implementation, when performing the zooming process, the terminal first digitally zooms the first image based on a current focal length range to obtain a first digitally-zoomed stabilized image corresponding to a FOV that is same as the FOV corresponding to the current focal length range. Then, the terminal re-projects the second image based on the third extrinsic parameter change matrix information to obtain a re-projected second image aligned with the first digitally-zoomed stabilized image. Further, the terminal fuses the first digitally-zoomed stabilized image and the second re-projected image to obtain a zoomed image having an FOV that is same as the FOV of the first digitally-zoomed stabilized image and a definition that is higher than that of the first digitally-zoomed stabilized image. The zoomed image is an image obtained by optimizing the definition of the first digitally-zoomed stabilized image with reference to pixels in the second re-projected image.

Figure 10:
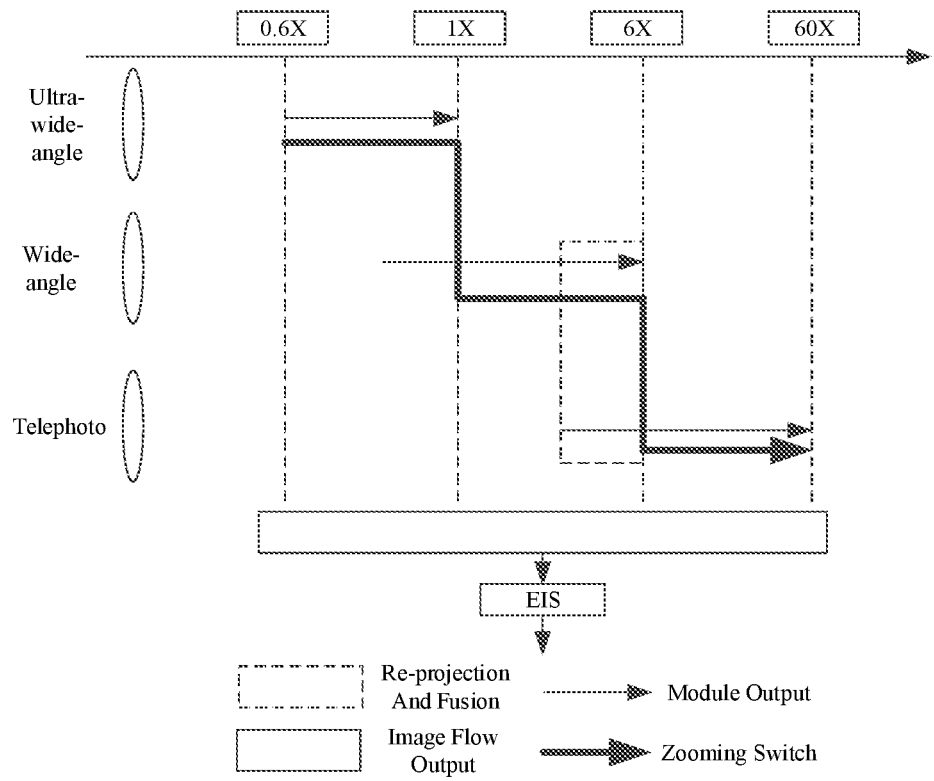
FIG. 10 is a schematic diagram showing the principle of the implementation process of the image stabilization method shown in FIG. 9.

Schematically, as shown in FIG. 10, taking the process of switching from a wide-angle lens to a telephoto lens as an example, for a wide-angle image outputted from the wide-angle lens and a telephoto image outputted from the telephoto lens, the terminal re-projects the telephoto image, digitally zooms the wide-angle image, and fuses the digitally-zoomed wide-angle image with the re-projected telephoto image to obtain a zoomed image.

At step 903, an electric image stabilization process is performed on the zoomed image based on the third extrinsic parameter change matrix information and fourth extrinsic parameter change matrix information to obtain a target image. The fourth extrinsic parameter change matrix information indicates changes in extrinsic parameters as measured when the camera modules are shaking.

Since the image has been re-projected once in the zooming process, in order to re-project the zoomed image in the correct posture, the terminal needs to obtain the first measured value in the electric image stabilization process, in addition to obtaining the four extrinsic parameter change matrix information as measured, it is also necessary to obtain the matrix information used by the terminal to re-project the image in the zooming process (that is, the changes in the posture of the terminal), and then perform the re-projection in the electric image stabilization process based on the two pieces of matrix information, thereby ensuring the re-projection to be made from the actual current posture towards the target posture for image stabilization.

Optionally, the rotation matrix change information in the fourth extrinsic parameter change matrix information may be calculated by the terminal based on an angular velocity collected by a gyroscope.

In a possible implementation, this step may include the following steps.

1. For pixels in the zoomed image, the pixel are re-projected based on the third extrinsic parameter change matrix information and the fourth extrinsic parameter change matrix information to obtain re-projected pixels.

In a possible implementation, the process of re-projecting the pixels in the zoomed image may use the following equation:

$$\begin{bmatrix} u \\ v \\ 1 \end{bmatrix} = K' \begin{bmatrix} R & T \\ 0 & 1 \end{bmatrix} \begin{bmatrix} R' & T' \\ 0 & 1 \end{bmatrix}^{-1} K'^{-1} \begin{bmatrix} u' \\ v' \\ 1 \end{bmatrix}, \quad \text{(Equation 6)}$$

where (u', v') represent the pixel coordinates of the pixel in the zoomed image, (u, v) represent the pixel coordinates of the pixel in the target image after the electric image stabilization process, R' and T' represent the rotation matrix and the translation matrix (i.e., the fourth extrinsic parameter change matrix information) for re-projecting the image in the electric image stabilization process, R and T represent the rotation matrix and the translation matrix (i.e., the third extrinsic parameter matrix information) between the modules in the zooming process, and K represents the intrinsic parameter matrix (when the optical image stabilization function is provided, it can be replaced with a new intrinsic parameter matrix K' after lens movement).

2. The target image is generated based on the re-projected pixels.

After completing the re-projection of the pixels in the zoomed image, the terminal obtains the target image.

In other possible implementations, in addition to re-projecting each pixel individually, in order to reduce the amount of calculation in the re-projection process, the terminal can perform a meshing process the zoomed image, re-project the pixels in the mesh after the meshing process, and then calculate differences for the coordinates of other pixels in the mesh based on the coordinate offsets between the pixels before and after the re-projection, and finally determine the pixel coordinates of each pixel in the mesh after the re-projection. This embodiment is not limited to this.

Schematically, as shown in FIG. 10, taking the process of switching from a wide-angle lens to a telephoto lens as an example, the zoomed image obtained after re-projection and fusion is further subjected to electric image stabilization and then outputted, for finally displaying on a viewfinder screen.

At step 904, the target image is displayed on the viewfinder screen.

For the implementation of this step, reference may be made to the above step 303, and details thereof will be omitted here.

In this embodiment, the terminal first performs the electric image stabilization on the images outputted from the camera modules, and provides the matrix information for the re-projection operation performed by the electric image stabilization module on the image to the zooming module, so as to ensure that the zooming module can perform re-projection in the zooming process in the correct posture, thereby avoiding the conflict between the re-projection in the zooming process and the re-projection in the electric image stabilization process and improving the accuracy of the re-projection in the electric image stabilization process.

In this embodiment, the terminal first performs the zooming process on the images outputted from the camera modules, and provides the matrix information for the re-projection operation performed by the zooming module on the image to the in the electric image stabilization process module, so as to ensure that the in the electric image stabilization process module can perform re-projection in the electric image stabilization process in the correct posture, thereby avoiding the conflict between the re-projection in the zooming process and the re-projection in the electric image stabilization process and improving the accuracy of the re-projection in the electric image stabilization process.

In addition to the combination of electric image stabilization and multi-camera zooming in the above embodiments, when the first camera module and/or the second camera module has an optical image stabilization function, the optical image stabilization can be combined with electric image stabilization and multi-camera zooming.

In a possible implementation, before the camera modules output images, the terminal obtains shake data (i.e., angular velocity data) of the camera module as collected by a gyroscope, and performs optical image stabilization on the first camera module and/or the second camera module based on the shake data of the camera module. In the optical image stabilization process, the camera modules control the lenses in the modules to move in the opposite direction based on the shake direction, so as to offset the impact of the shake on imaging. Accordingly, the first image and/or the second image outputted from the first camera module and/or the second camera module are the images that have been subjected to optical image stabilization.

When the shake of the image can be eliminated with the optical image stabilization, additional electric image stabilization may result in a waste of computing resources. In a possible implementation, when the shake data of the camera module indicates that the shake amplitude is greater than a amplitude threshold (for example, ±5°), since the optical image stabilization cannot completely eliminate the shake of the image, the terminal needs to process the first image and the second image in the predetermined processing scheme to obtain the target image. When the shake data of the camera module indicates that the shake amplitude is smaller than the amplitude threshold, since the optical image stabilization can eliminate the shake of the image, the terminal only needs to perform the zooming process on the first image and the second image, without any electric image stabilization, so as to avoid the waste of computing resources caused by the electric image stabilization.

Figure 11:
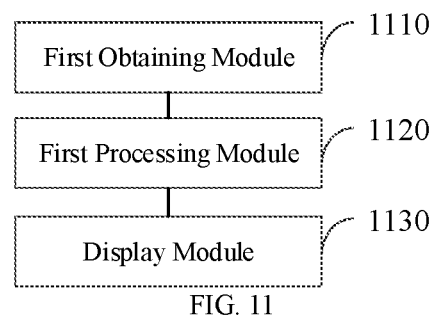
FIG. 11 is a schematic diagram showing a structure of an image stabilization apparatus according to an exemplary embodiment of the present disclosure.

FIG. 11 is a schematic diagram showing a structure of an image stabilization apparatus according to an exemplary embodiment of the present disclosure. The apparatus can be implemented as a part or all of the terminal shown in FIG. 1 in software, hardware, or a combination of software and hardware. The apparatus includes a first obtaining module 1110, a first processing module 1120, and a display module 1130.

The first obtaining module 1110 is configured to obtain a first image outputted from a first camera module of the at least two camera modules and a second image outputted from a second camera module of the at least two camera modules.

The first processing module 1120 is configured to process, in a zooming process, the first image and the second image in a predetermined processing scheme to obtain a target image, the predetermined processing scheme comprising an electric image stabilization process and a zooming process. The zooming process is a process of switching from the first camera module to the second camera module.

The display module 1130 is configured to display the target image on a viewfinder screen.

Optionally, the first processing module 1120 may include a first stabilizing and zooming unit, or a second stabilizing and zooming unit.

The first stabilizing and zooming unit is configured to perform the electric image stabilization process on the first image and the second image, and then perform the zooming process on matrix information outputted in the electric image stabilization process to obtain the target image.

The second stabilizing and zooming unit is configured to perform the zooming process on the first image and the second image, and then perform the electric image stabilization process on matrix information outputted in the zooming process to obtain the target image. Optionally, the first stabilizing and zooming unit may be configured to perform the electric image stabilization process on the first image and the second image based on first extrinsic parameter change matrix information to obtain a first stabilized image and a second stabilized image, the first extrinsic parameter change matrix information indicating changes in extrinsic parameters as measured when the camera modules are shaking; and perform the zooming process on the first stabilized image and the second stabilized image based on the first extrinsic parameter change matrix information and second extrinsic parameter change matrix information to obtain the target image, the second extrinsic parameter change matrix information indicating a difference in extrinsic parameters between the first camera module and the second camera module in the zooming process.

Optionally, the first stabilizing and zooming unit may be further configured to zoom the first stabilized image digitally based on a current focal length range to obtain a first digitally-zoomed stabilized image corresponding to a Field of View (FOV) that is same as a FOV corresponding to the current focal length range; re-project the second stabilized image based on the second extrinsic parameter change matrix information and the first extrinsic parameter change matrix information to obtain a second re-projected stabilized image; and fuse the first digitally-zoomed stabilized image and the second re-projected stabilized image to obtain the target image.

Optionally, the second stabilizing and zooming unit may be configured to perform the zooming process on the first image and the second image based on third extrinsic parameter change matrix information to obtain a zoomed image, the third extrinsic parameter change matrix information indicating a difference of extrinsic parameters between the first camera module and the second camera module in the zooming process; and perform the electric image stabilization process on the zoomed image based on the third extrinsic parameter change matrix information and fourth extrinsic parameter change matrix information to obtain the target image, the fourth extrinsic parameter change matrix information indicating changes in extrinsic parameters as measured when the camera modules are shaking.

Optionally, the second stabilizing and zooming unit may be configured to: re-project pixels on the zoomed image based on the third extrinsic parameter change matrix information and the fourth extrinsic parameter change matrix information to obtain re-projected pixels; and generate the target image based on the re-projected pixels.

Optionally, the first camera module and/or the second camera module may have an optical image stabilization function, and the apparatus may further include a second obtaining module, and an optical image stabilizing module.

The second obtaining module is configured to obtain camera module shake data collected by a gyroscope.

The optical image stabilizing module is configured to perform an optical image stabilization process on the first camera module and/or the second camera module based on the camera module shake data.

The first processing module may be further configured to process the first image and the second image in the predetermined processing scheme to obtain the target image when the camera module shake data indicates that a shake amplitude is greater than an amplitude threshold.

To summarize, in this embodiment, for a terminal equipped with at least two camera modules, in a process of switching from a first camera module to a second camera module, a first image outputted from the first camera module and a second image outputted from the second camera module can be obtained, and a predetermined process can be performed on the first image and the second image, so as to obtain a target image that has been subjected to an electric image stabilization process and a zooming process, and then the target image can be displayed on a viewfinder screen. Since the finally displayed target image has been subjected to the electronic stabilization process and the zooming process, the shake of the image caused by the shake of the terminal during the zooming process can be reduced while ensuring smooth switching of the image during the zooming process, thereby improving the stability of the image on the viewfinder screen.

It is to be noted that when the apparatus according to the above embodiment implements the image stabilization method according to the embodiment of the present disclosure, the division of the above functional modules is used only as an example for illustration. In actual applications, the above functions can be allocated to different functional modules. That is, the internal structure of the apparatus can be divided into different functional modules to provide all or part of the functions described above. In addition, the image stabilization apparatus according to the above embodiment belongs to the same concept as the embodiment of the image stabilization method. For the specific implementation process, reference can be made to the method embodiment and details thereof will be omitted here.

It can be appreciated by those of ordinary skill in the art that all or part of the steps in the above embodiment can be implemented by hardware, or by a program instructing relevant hardware. The program can be stored in a computer-readable storage medium, which can be a read-only memory, a magnetic disk or an optical disc, etc.

While the preferred embodiments of the present disclosure have been described above, they are not intended to limit the present disclosure. Any modifications, equivalents, or improvements that can be made within the spirit and principle of the present disclosure are to be encompassed by the scope of the present disclosure.

What is claimed is:

1. An image stabilization method, applied in a terminal equipped with at least two camera modules corresponding to different focal length ranges, the method comprising:
   obtaining a first image outputted from a first camera module of the at least two camera modules and a second image outputted from a second camera module of the at least two camera modules;
   processing, in a zooming process, the first image and the second image in a predetermined processing scheme to obtain a target image, the predetermined processing scheme comprising an electric image stabilization process and a zooming process, the zooming process being a process of switching from the first camera module to the second camera module; and
   displaying the target image on a viewfinder screen,
   wherein said processing the first image and the second image in the predetermined processing scheme to obtain the target image comprises: performing the electric image stabilization process on the first image and the second image, and then performing the zooming process on matrix information outputted in the electric image stabilization process to obtain the target image, or performing the zooming process on the first image and the second image, and then performing the electric image stabilization process on matrix information outputted in the zooming process to obtain the target image.

2. The method according to claim 1, wherein said performing the electric image stabilization process on the first image and the second image, and then performing the zooming process on the matrix information outputted in the electric image stabilization process to obtain the target image comprises:
   performing the electric image stabilization process on the first image and the second image based on first extrinsic parameter change matrix information to obtain a first stabilized image and a second stabilized image, the first extrinsic parameter change matrix information indicating changes in extrinsic parameters as measured when the camera modules are shaking; and
   performing the zooming process on the first stabilized image and the second stabilized image based on the first extrinsic parameter change matrix information and second extrinsic parameter change matrix information to obtain the target image, the second extrinsic parameter change matrix information indicating a difference in extrinsic parameters between the first camera module and the second camera module in the zooming process.

3. The method according to claim 2, wherein said performing the zooming process on the first stabilized image and the second stabilized image based on the first extrinsic parameter change matrix information and the second extrinsic parameter change matrix information to obtain the target image comprises:
   zooming the first stabilized image digitally based on a current focal length range to obtain a first digitally-zoomed stabilized image corresponding to a Field of View (FOV) that is same as a FOV corresponding to the current focal length range;
   re-projecting the second stabilized image based on the second extrinsic parameter change matrix information and the first extrinsic parameter change matrix information to obtain a second re-projected stabilized image; and
   fusing the first digitally-zoomed stabilized image and the second re-projected stabilized image to obtain the target image.

4. The method according to claim 1, wherein said performing the zooming process on the first image and the second image, and then performing the electric image stabilization process on the matrix information outputted in the zooming process to obtain the target image comprises:

performing the zooming process on the first image and the second image based on third extrinsic parameter change matrix information to obtain a zoomed image, the third extrinsic parameter change matrix information indicating a difference of extrinsic parameters between the first camera module and the second camera module in the zooming process; and performing the electric image stabilization process on the zoomed image based on the third extrinsic parameter change matrix information and fourth extrinsic parameter change matrix information to obtain the target image, the fourth extrinsic parameter change matrix information indicating changes in extrinsic parameters as measured when the camera modules are shaking.

5. The method according to claim 4, wherein said performing the electric image stabilization process on the zoomed image based on the third extrinsic parameter change matrix information and the fourth extrinsic parameter change matrix information to obtain the target image comprises:

re-projecting pixels in the zoomed image based on the third extrinsic parameter change matrix information and the fourth extrinsic parameter change matrix information to obtain re-projected pixels; and generating the target image based on the re-projected pixels.

6. The method according to claim 1, wherein the first camera module and/or the second camera module has an optical image stabilization function, and wherein the method further comprises, prior to obtaining the first image outputted from the first camera module of the at least two camera modules and the second image outputted from the second camera module of the at least two camera modules:

obtaining camera module shake data collected by a gyroscope; and performing an optical image stabilization process on the first camera module and/or the second camera module based on the camera module shake data, and wherein said processing the first image and the second image in the predetermined processing scheme to obtain the target image is performed when the camera module shake data indicates that a shake amplitude is greater than an amplitude threshold.

7. A terminal, comprising at least two camera modules corresponding to different focal length ranges, a processor, a memory, and a display module, the memory storing at least one instruction that is executed by the processor to:

obtain a first image outputted from a first camera module of the at least two camera modules and a second image outputted from a second camera module of the at least two camera modules;

process, in a zooming process, the first image and the second image in a predetermined processing scheme to obtain a target image, the predetermined processing scheme comprising an electric image stabilization process and a zooming process, the zooming process being a process of switching from the first camera module to the second camera module; and control the display module to display the target image on a viewfinder screen, wherein the processor is configured to: perform the electric image stabilization process on the first image and the second image, and then perform the zooming process on matrix information outputted in the electric image stabilization process to obtain the target image, or perform the zooming process on the first image and the second image, and then perform the electric image stabilization process on matrix information outputted in the zooming process to obtain the target image.

8. The terminal according to claim 7, wherein the processor is configured to:

perform the electric image stabilization process on the first image and the second image based on first extrinsic parameter change matrix information to obtain a first stabilized image and a second stabilized image, the first extrinsic parameter change matrix information indicating changes in extrinsic parameters as measured when the camera modules are shaking; and perform the zooming process on the first stabilized image and the second stabilized image based on the first extrinsic parameter change matrix information and second extrinsic parameter change matrix information to obtain the target image, the second extrinsic parameter change matrix information indicating a difference in extrinsic parameters between the first camera module and the second camera module in the zooming process.

9. The terminal according to claim 8, wherein the processor is configured to:

zoom the first stabilized image digitally based on a current focal length range to obtain a first digitally-zoomed stabilized image corresponding to a Field of View (FOV) that is same as a FOV corresponding to the current focal length range;

re-project the second stabilized image based on the second extrinsic parameter change matrix information and the first extrinsic parameter change matrix information to obtain a second re-projected stabilized image; and fuse the first digitally-zoomed stabilized image and the second re-projected stabilized image to obtain the target image.

10. The terminal according to claim 7, wherein the processor is configured to:

perform the zooming process on the first image and the second image based on third extrinsic parameter change matrix information to obtain a zoomed image, the third extrinsic parameter change matrix information indicating a difference of extrinsic parameters between the first camera module and the second camera module in the zooming process; and perform the electric image stabilization process on the zoomed image based on the third extrinsic parameter change matrix information and fourth extrinsic parameter change matrix information to obtain the target image, the fourth extrinsic parameter change matrix information indicating changes in extrinsic parameters as measured when the camera modules are shaking.

11. The terminal according to claim 10, wherein the processor is configured to:

re-project pixels on the zoomed image based on the third extrinsic parameter change matrix information and the fourth extrinsic parameter change matrix information to obtain re-projected pixels; and generate the target image based on the re-projected pixels.

12. The terminal according to claim 7, wherein the processor is configured to:

obtain camera module shake data collected by a gyroscope; and perform an optical image stabilization process on the first camera module and/or the second camera module based on the camera module shake data, and the processor is further configured to:

process the first image and the second image in the predetermined processing scheme to obtain the target image when the camera module shake data indicates that a shake amplitude is greater than an amplitude threshold.

13. A non-transitory computer-readable storage medium, storing at least one instruction that is executed by a processor to implement an image stabilization method applied in a terminal equipped with at least two camera modules corresponding to different focal length ranges, the method comprising:
obtaining a first image outputted from a first camera module of the at least two camera modules and a second image outputted from a second camera module of the at least two camera modules;
processing, in a zooming process, the first image and the second image in a predetermined processing scheme to obtain a target image, the predetermined processing scheme comprising an electric image stabilization process and a zooming process, the zooming process being a process of switching from the first camera module to the second camera module; and
displaying the target image on a viewfinder screen,
wherein said processing the first image and the second image in the predetermined processing scheme to obtain the target image comprises: performing the electric image stabilization process on the first image and the second image, and then performing the zooming process on matrix information outputted in the electric image stabilization process to obtain the target image, or performing the zooming process on the first image and the second image, and then performing the electric image stabilization process on matrix information outputted in the zooming process to obtain the target image.

14. The non-transitory computer-readable storage medium according to claim 13 wherein said performing the electric image stabilization process on the first image and the second image, and then performing the zooming process on the matrix information outputted in the electric image stabilization process to obtain the target image comprises:
performing the electric image stabilization process on the first image and the second image based on first extrinsic parameter change matrix information to obtain a first stabilized image and a second stabilized image, the first extrinsic parameter change matrix information indicating changes in extrinsic parameters as measured when the camera modules are shaking; and
performing the zooming process on the first stabilized image and the second stabilized image based on the first extrinsic parameter change matrix information and second extrinsic parameter change matrix information to obtain the target image, the second extrinsic parameter change matrix information indicating a difference in extrinsic parameters between the first camera module and the second camera module in the zooming process.

15. The non-transitory computer-readable storage medium according to claim 14, wherein said performing the zooming process on the first stabilized image and the second stabilized image based on the first extrinsic parameter change matrix information and the second extrinsic parameter change matrix information to obtain the target image comprises:
zooming the first stabilized image digitally based on a current focal length range to obtain a first digitally-zoomed stabilized image corresponding to a Field of View (FOV) that is same as a FOV corresponding to the current focal length range;
re-projecting the second stabilized image based on the second extrinsic parameter change matrix information and the first extrinsic parameter change matrix information to obtain a second re-projected stabilized image; and
fusing the first digitally-zoomed stabilized image and the second re-projected stabilized image to obtain the target image.

16. The non-transitory computer-readable storage medium according to claim 13, wherein said performing the zooming process on the first image and the second image, and then performing the electric image stabilization process on the matrix information outputted in the zooming process to obtain the target image comprises:
performing the zooming process on the first image and the second image based on third extrinsic parameter change matrix information to obtain a zoomed image, the third extrinsic parameter change matrix information indicating a difference of extrinsic parameters between the first camera module and the second camera module in the zooming process; and
performing the electric image stabilization process on the zoomed image based on the third extrinsic parameter change matrix information and fourth extrinsic parameter change matrix information to obtain the target image, the fourth extrinsic parameter change matrix information indicating changes in extrinsic parameters as measured when the camera modules are shaking.

17. The non-transitory computer-readable storage medium according to claim 16, wherein said performing the electric image stabilization process on the zoomed image based on the third extrinsic parameter change matrix information and the fourth extrinsic parameter change matrix information to obtain the target image comprises:
re-projecting pixels in the zoomed image based on the third extrinsic parameter change matrix information and the fourth extrinsic parameter change matrix information to obtain re-projected pixels; and
generating the target image based on the re-projected pixels.

* * * * *